United States Patent
Al Qudah et al.

(10) Patent No.: US 10,492,646 B2
(45) Date of Patent: Dec. 3, 2019

(54) DEVICE FOR MOLDING A FOODSTUFF

(71) Applicants: Sohaib Al Qudah, Katy, TX (US);
Muhannad Rabeh, Houston, TX (US)

(72) Inventors: Sohaib Al Qudah, Katy, TX (US);
Muhannad Rabeh, Houston, TX (US)

(*) Notice: Subject to any disclaimer, the term of this patent is extended or adjusted under 35 U.S.C. 154(b) by 111 days.

(21) Appl. No.: 15/489,771

(22) Filed: Apr. 18, 2017

(65) Prior Publication Data
US 2018/0296039 A1   Oct. 18, 2018

(51) Int. Cl.
| A47J 43/20 | (2006.01) |
| A22C 7/00 | (2006.01) |
| A22C 17/00 | (2006.01) |
| A21B 5/04 | (2006.01) |

(52) U.S. Cl.
CPC .............. *A47J 43/20* (2013.01); *A21B 5/04* (2013.01); *A22C 7/003* (2013.01); *A22C 7/0046* (2013.01); *A22C 17/0066* (2013.01)

(58) Field of Classification Search
CPC ...... A47J 43/20; A22C 17/0066; A22C 7/003; A22C 7/0046; A21B 3/137; A21B 3/133; A47G 21/12
USPC .............................. 425/561, 469; 249/91–94
See application file for complete search history.

(56) References Cited

U.S. PATENT DOCUMENTS

| 2,021,794 A | * | 11/1935 | Leone ....................... A22C 7/00 425/574 |
| 2,414,230 A | * | 1/1947 | Johnson ................. A47G 21/12 220/288 |
| 2,747,522 A | * | 5/1956 | Dietz Newland ...... A22C 11/08 118/24 |
| 2,979,431 A | * | 4/1961 | Perrault .................. B29C 48/15 156/244.12 |
| 3,271,813 A | | 9/1966 | Gernandt et al. |
| 3,817,674 A | * | 6/1974 | Paige ..................... A23P 10/10 425/113 |
| 4,648,153 A | * | 3/1987 | Coroneos ................. A22C 7/00 425/382 R |

(Continued)

FOREIGN PATENT DOCUMENTS

| CA | 2146595 A1 | 10/1996 |
| GB | 2212096 B | 7/1989 |

(Continued)

OTHER PUBLICATIONS

Ursu, Roman. How to Make a Kebab Machine | Tutorial. Feb. 9, 2016. Youtube. url: <https://www.youtube.com/watch?v=IQJh7kDTYF4> (Year: 2016).*

*Primary Examiner* — Leith S Shafi
(74) *Attorney, Agent, or Firm* — Johan Eide; Christopher Pilling; My Patent Guys

(57) ABSTRACT

Provided herein is device and kit for molding a foodstuff, for example, a ground meat or a bread dough, to make a kabob. Generally, the separate component parts of the device are a container, a mold and a press which are removably engageable one with the other. Particularly, the container is fluidly connected to the mold via a bayonet connector. The press is configured to slide within the connector and to provide a support base for the connector and mold when assembled. The press has a removable cap and also is a storage container for the skewers used to make the kabobs. The kit for molding the foodstuff contains the device and skewers stored within the press.

7 Claims, 7 Drawing Sheets

(56) References Cited

U.S. PATENT DOCUMENTS

| | | | | |
|---|---|---|---|---|
| 8,152,506 B1* | 4/2012 | Khoshaba | ............... | A23P 30/20 425/113 |
| 2007/0245893 A1* | 10/2007 | Chen | ................ | A23P 30/20 92/247 |

FOREIGN PATENT DOCUMENTS

| | | |
|---|---|---|
| GB | 2484700 B | 4/2012 |
| NL | 1018650 C2 | 1/2003 |

* cited by examiner

DEVICE FOR MOLDING A FOODSTUFF

BACKGROUND OF THE INVENTION

Field of the Invention

The present invention generally relates to the fields of food preparation and appliances. More specifically, the present invention relates to a device for individual use that molds a foodstuff, such as a ground meat, around a skewer to produce a kabob.

Description of the Related Art

Kabobs are a popular food item and relatively easy to prepare when putting chunks or slices of meat onto a skewer or stick prior to cooking. However, to make a kabob using a ground or minced meat requires more preparation time. Making a kabob with ground meat by hand requires shaping the meat as either a meatball or attempting to roll it or pat it into an elongated shape prior to skewering the meat. The longer or larger the shaped meat is, the more difficult it is to then slide a skewer through it while keeping the skewer in the middle of the shaped meat. Unlike a hot dog, for example, the ground meat is unlikely to hold its shape with the manipulation required to insert the skewer.

Many apparatuses and appliances for shaping food around a skewer are available. These can be bulky and cumbersome to use and contain movable parts operable via a motor or a crank. The failure of any one of these parts renders the whole useless. Moreover, the majority are designed for use in food packaging processes to automate the process or to produce bulk amounts in the food service industry to sell to consumers. An apparatus or device workable by an individual to prepare kabobs for personal or family consumption or for entertaining often requires securing to a table or counter for stability during use and/or that the individual manually pulls the skewer as the kabob is formed around it.

Therefore, there is a recognized need in the art for a more efficient and less cumbersome device for molding a foodstuff. Particularly, the prior art is deficient in a device that is easily manipulatable by an individual to simultaneously mold a foodstuff around a skewer and to extrude the skewered foodstuff from the device by the simple action of the foodstuff moving the skewer through the device. The present invention fulfills this long-standing need and desire in the art.

SUMMARY OF THE INVENTION

The present invention is directed to device for molding a foodstuff. The device comprises a container for the foodstuff, a molding component removably connected to the container and a press removably engageable with the container. The present invention is directed to a related device further comprising a skewer that is removably insertable through the molding component.

The present invention also is directed to a foodstuff molding assembly. The molding assembly comprises a hollow container that is configured to contain the foodstuff therein and is in fluid connection with a hollow mold that is configured to receive the foodstuff therethrough. A press is insertable into the hollow container and is configured to move the foodstuff from the container into and through the mold. The present invention is directed to a related foodstuff molding assembly further comprising a skewer inserted through the mold and movable therein.

The present invention is directed further to a kit for molding a foodstuff. The kit comprises the foodstuff molding device and assembly as described herein and a plurality of food skewers stored with the press comprising the device and assembly.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1A:
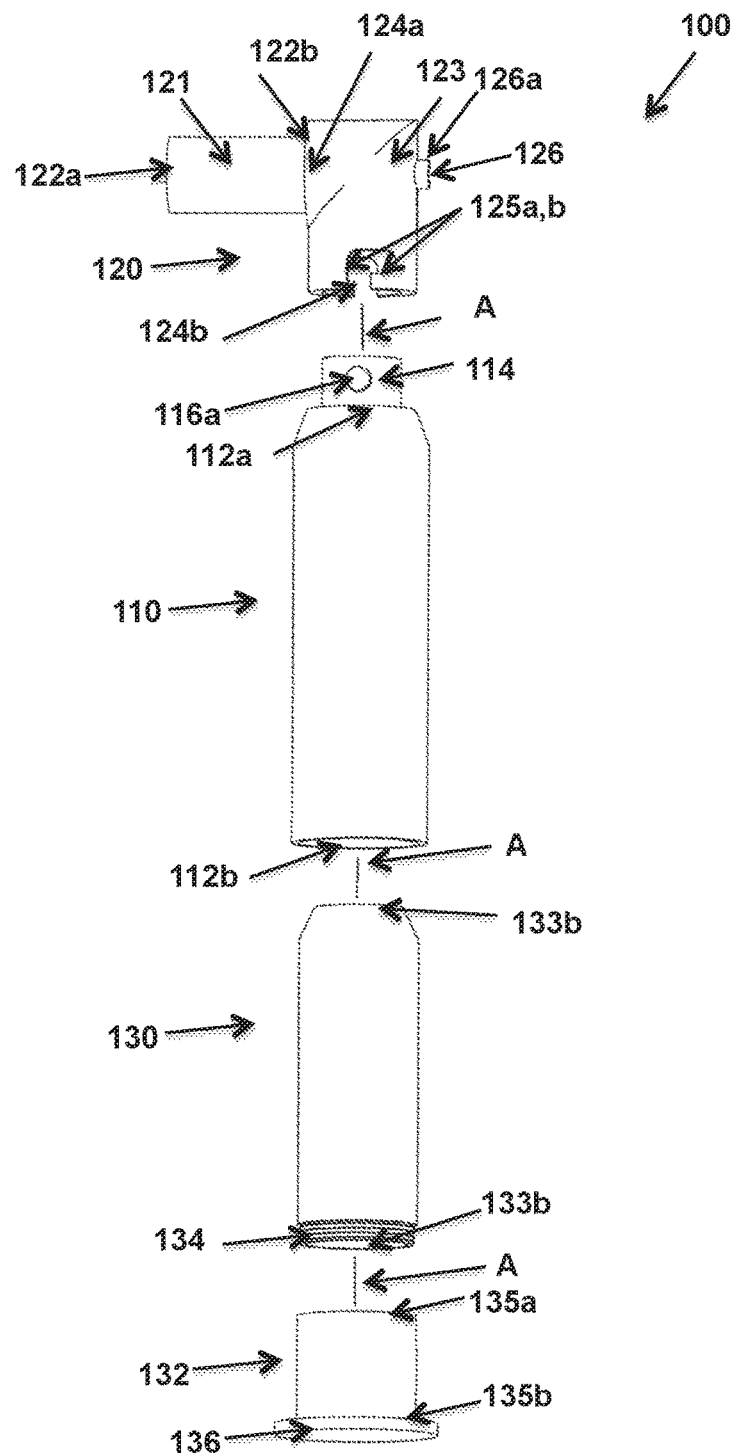
FIG. 1A is an exploded side view of the device.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the term proximal refers to the molding or shaping end of the device and the term "distal" refers to portions or components of the device away from the molding or shaping end thereof.

In one embodiment of the present invention there is provided a device for molding a foodstuff, comprising a container for the foodstuff; a molding component removably connected to the container; and a press removably engageable with the container. Further to this embodiment the device may comprise a skewer removably insertable through the molding component. In both embodiments the foodstuff may be a ground meat, a minced meat, a bread dough a biscuit dough, or a cookie dough.

In both embodiments the container may comprise a substantially cylindrical hollow body with a proximal open container end and a distal open container end; a projection formed circumferentially around the proximal open container end; and a pair of pins disposed oppositely on an outer surface of the projection and slidably engageable with the molding component.

Also in both embodiments the molding component may comprise a molding portion with a hollow interior and having a proximal open molding end and a distal open molding end; a connecting portion formed at the distal open molding end of the molding portion and depending downwardly and substantially perpendicularly therefrom in a fluid connection with the hollow interior of the molding portion and the hollow body of the container, said connecting portion comprising a pair of L-shaped slots formed oppositely on a distal open connecting end thereof configured to slidably engage the pair of pins on the container; and an aperture disposed through a back surface of the connecting portion to the hollow interior. Particularly, the pair of pins on the container and the pair of L-shaped slots on the molding component may comprise a bayonet connector when slidably engaged. Representative examples of the molding portion may have an inner surface with a cylindrical shape, a rectangular shape, a square shape, or a triangular shape.

In addition in both embodiments the press may comprise a substantially cylindrical hollow body with a closed proximal end and a distal exteriorally threaded open end; and a cap with a hollow interior having a proximal open interiorally threaded end and a base plate disposed on a distal end thereof, where the cap is threadably engageable with the distal open threaded end of the hollow body of the press. Also the hollow body of the press has an outer diameter less than an inner diameter of the hollow body of the container such that the press is slidable therewithin. In addition the hollow interior of the press may be a storage container.

In another embodiment of the present invention there is provided a kit for molding a foodstuff, comprising the device as described supra; and a plurality of food skewers stored within the press.

In yet another embodiment of the present invention there is provided a foodstuff molding assembly, comprising a hollow container configured to contain the foodstuff therein in fluid connection with a hollow mold configured to receive the foodstuff therethrough; and a press insertable into the hollow container configured to move the foodstuff from the container through the mold. Further to this embodiment the foodstuff molding assembly may comprise a skewer a skewer inserted through the mold and movable therein. In both embodiments the foodstuff may be a ground meat, a minced meat, a bread dough a biscuit dough, or a cookie dough.

In both embodiments the hollow container has a first open connecting end and a press receiving end and the hollow mold has a molding portion with an open molding end and a connecting portion depending downwardly from the molding portion oppositely to the open molding end at about a right angle, where the connecting portion has a second open connecting end coincident with the first open connecting end. Particularly, the first open connecting end may comprise a male portion of a bayonet connector formed circumferentially thereon and the second open connecting end may comprise a female portion of the bayonet connector formed circumferentially thereon such that when rotatably engaged the male and female portions of the first and second open connector ends form the fluid connection between the container and the mold. In a representative example the male portion of the bayonet connector comprises a pair of pins disposed oppositely on an outer surface of the projection and the female portion of the bayonet connector comprises a pair of L-shaped slots formed oppositely on an edge of the second open connecting end.

Also in both embodiments the press may comprise a hollow body with a closed press end and an exteriorally threaded open end; and a cap with a hollow interior having an open interiorally threaded end and a base plate end, where the cap is threadably engageable with the exteriorally threaded open end of the hollow body. Also the hollow body of the press has an outer diameter less than an inner diameter of the hollow body of the container such that the foodstuff moves only through the container into the mold when the press is moved within the container. In addition the hollow interior of the press may be a storage container configured to contain a plurality of food skewers therein.

Provided herein is a device for molding or shaping a foodstuff around a skewer or stick. Generally, the device comprises a means for containing the foodstuff and a skewer therein and a means for pushing the foodstuff and with it the skewer through the device so that the foodstuff is molded or shaped around the skewer as both move out of the device. For example, the device comprises a container into which the foodstuff is placed, a molding component or mold configured to receive a skewer and through which the foodstuff and skewer are pressed and a press to move the foodstuff into and through the molding component or mold.

The container or container body is hollow with proximal and distal open container ends and may have a substantially cylindrical shape which enables a better grip for a user, although other body shapes may be used. The container body has a means for connecting to the mold formed from the proximal open end. For example, the connecting means may comprise a male component of a connector such as a projection with at least a pair of pins oppositely disposed thereon. Alternatively, the connecting means may comprise exterior threads around the edge of the proximal open end of the container.

The molding component or mold has a hollow molding portion or hollow molding body and a hollow connecting portion or hollow connecting body. The hollow connecting portion extends substantially perpendicularly and downwardly from the molding portion and is fluidly connected to the hollow molding component. The combination of the molding portion and connecting portion forms a single piece substantially 90 degree elbow-shaped mold.

The hollow molding portion has an open proximal end. The hollow connecting portion is formed at the distal end of the molding portion such that the length of the molding portion is extended. The back surface of the hollow connecting portion is substantially closed except for an aperture disposed through to the hollow interior. The aperture has dimensions to slidably receive a skewer or stick therethrough around which a foodstuff is molded. The dimensions are sufficient to enable a skewer to slide into the mold and to easily move through the molding portion as the foodstuff is pressed into the mold without leakage through the aperture.

The hollow molding portion has an open proximal end. The hollow connecting portion is formed at the distal end of the molding portion such that the length of the molding portion is extended. The back surface of the hollow connecting portion is substantially closed except for an aperture disposed through to the hollow interior. The aperture has dimensions to slidably receive a skewer or stick therethrough around which a foodstuff is molded, Surrounding the aperture a rim 126a further guides the skewer in a linear path, therein centering the skewer within the foodstuff. The dimensions are sufficient to enable a skewer to slide into the mold and to easily move through the molding portion as the foodstuff is pressed into the mold without leakage through the aperture.

The bayonet connector enables a user with a single fluid motion to easily line up the pins with the short arm of the L-shaped slots, engage the pins within the short arm of the L-shaped slots and to turn the container toward the ends of the long arm of the L-shaped slots to removably secure the pins therein. The molding component remains secured to the container until the securing action is reversed and the components are separated. Alternatively, the molding component or mold may be formed directly on the open proximal end of the container component as an extension thereof such that the container component and the molding component form a single hollow piece.

The press has a body shape that corresponds to that of the container body and has an exterior diameter substantially equivalent to, but less than, the interior diameter of the distal open end of the container. This enables the press to slide within the container to push the foodstuff into and through the mold. The press has a closed proximal end that contacts the foodstuff within the container and an open distal end with exterior threads around the outer edge of the open end. A cap has a hollow body with an open proximal end and a base plate or support formed at the distal end thereof. The cap has interior threads disposed around the inner edge of the open end and are threadably engageable with the exterior threads to removably secure the cap to the press body. The diameter of the base plate is greater than the exterior diameter of the container. This provides a larger surface area against which a user can push when using the device. Alternatively, the base plate or support provides stability for the capped press or the assembled device having the capped press disposed therein when either are in an upright position on, for example, a counter, table, shelf, or other surface. The hollow body of the cap extends the interior length of the press to accommodate the skewers or sticks stored therein.

The device may be made of a lightweight, durable, easily cleaned material suitable for use with foodstuffs, particularly raw food. For example, the material may be, but is not limited to, a plastic, silicon, aluminum, or other material or combinations of materials. The material may comprise a biocompatible colorant or dye. The device may comprise a decorative design or have a decorative surface. The container and the press have dimensions that enable a user to easily hold the device. The length of the container accommodates the press when disposed inside.

The foodstuff may be a ground or minced meat foodstuff, such as, beef, poultry, pork, or lamb or may be a ground game meat such as venison. Alternatively, the foodstuff may be a bread dough, a biscuit dough or a cookie dough made from scratch or packaged uncooked dough. The degree to which the meat is ground or minced depends on the type of meat and whether or not other ingredients are added. The consistency of the ground or minced meat is sufficient to hold the molded shape around the skewer or stick after removal from the molding device.

During use, as the foodstuff is pushed through the container into the mold, it fills the space around the skewer and takes the interior shape of the mold. The friction of the foodstuff against the skewer enables the skewer with the foodstuff securely molded or shaped around it to be pushed from the mold via continued pressure against the foodstuff remaining in the container. Once the skewer or kebob is removed another skewer is inserted through the aperture on the mold and, if necessary, an additional amount of the foodstuff is added to the container. Thus, the present invention provides a method for shaping a foodstuff around a skewer to make, for example, a kebob for cooking, baking, frying, or grilling.

When finished, the user can easily disassemble the device for cleaning and reassemble the cleaned device for storage. The device can be stored upright in a cabinet or on a counter when the press is inserted into the container or the disassembled pieces may be stored separately, for example, in a drawer. Alternatively, the skewers or sticks may be stored in the hollow press. The skewers or sticks may remain within press during use. When another skewer or stick is required to be inserted through the molding component, the press is removed from the container, the cap removed and a skewer or stick selected.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1A depicts the components of the device in an exploded view. The device 100 generally comprises a container 110, a mold 120 and a press 130. The container is hollow and has proximal and distal open container ends 112a,b. A projection 114 is formed at the proximal open container end and has a pin 116a disposed thereon oppositely to a pin 116b (not shown).

The mold generally comprises a hollow molding portion 121 with a proximal open molding end 112a and a distal open molding end 112b on which a hollow connecting portion 123 is formed at a substantially right angle to the molding portion. The proximal open connecting end 124a is coincident with the distal open molding end 112b thereby effectively lengthening the hollow molding portion. The hollow connecting portion has a distal open connecting end 124b on which a pair of L-shaped slots 125a,b are formed. The connecting portion has an aperture 126 disposed through the back surface 124c of the connecting portion to the hollow interior of the mold. The components are removably engageable or securable one to the other along the axis A-A such the open ends 112a,b and 124b are coincident and form a continuously hollow interior.

The press 130 comprises a hollow press body 131 and a hollow cap 132. The hollow press body has a proximal closed pressing end 133a and a distal open threaded end 133b. The threads 134 are disposed exteriorally around the distal edge of the press body. The cap has a proximal open threaded end 135a (see FIG. 3A) and a base plate 136 formed on the distal end 135b thereof. The cap threads 137 (see FIG. 3A) are interiorally threaded onto the press body.

Figure 1B:
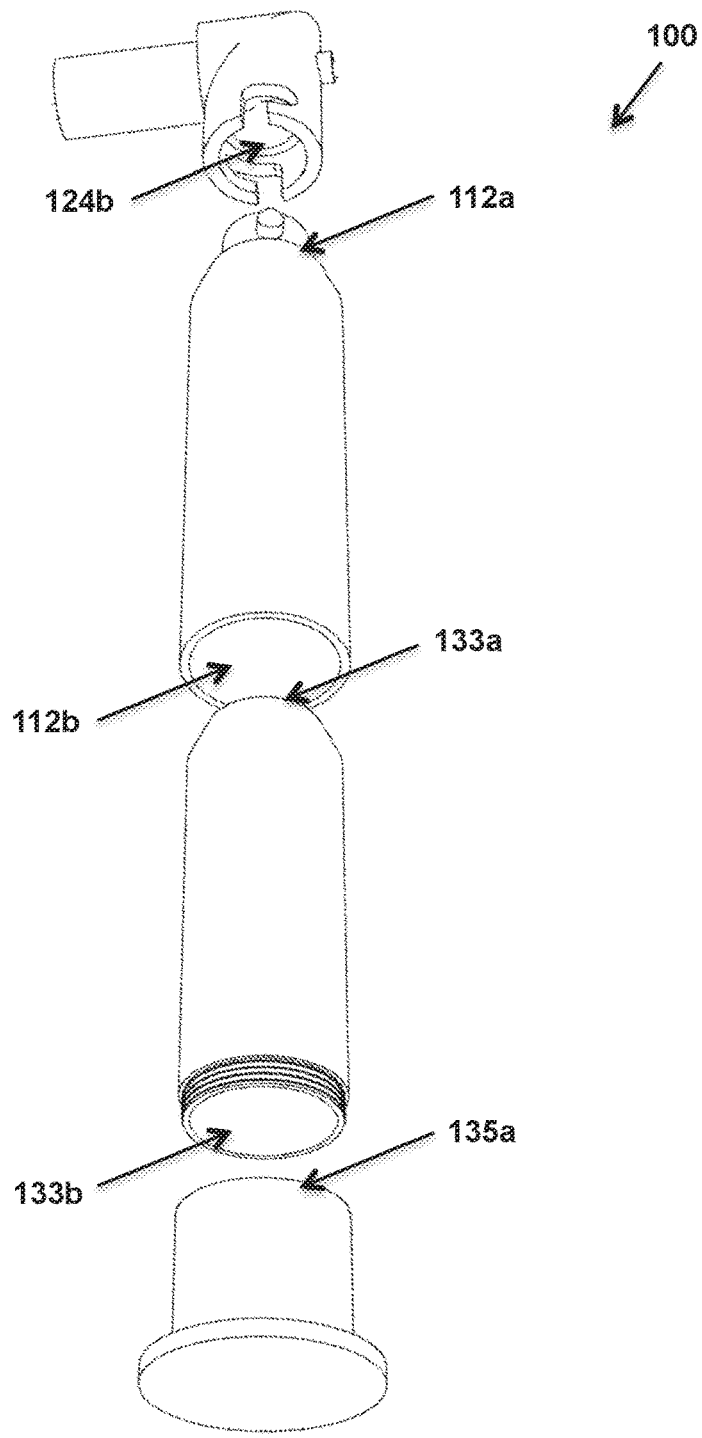
FIG. 1B is an exploded perspective view of FIG. 1A from the bottom.

FIG. 1B depicts the components of the device 100 from a bottom perspective view. This view illustrates the alignment of the proximal ends 112a, 133a and 135a with the respective distal ends 124b, 112b and 133b for easy assembly of the device.

Figure 2:
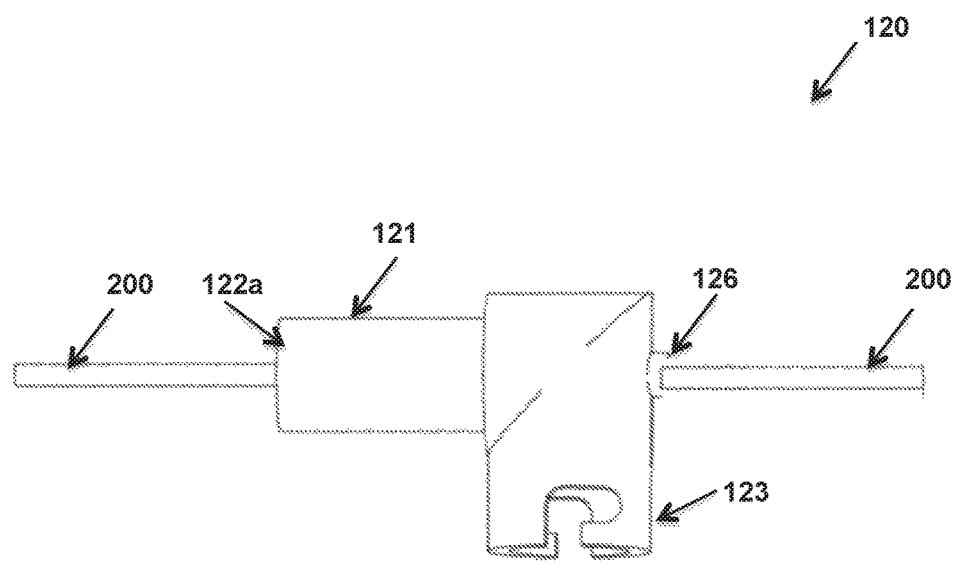
FIG. 2 is the exploded view of FIG. 2 illustrating the placement of the skewer.

With continued reference to FIG. 1A, FIG. 2 illustrates the placement of a skewer in the device 100. A skewer 200 is inserted through the aperture 126 on the mold 120 into and through the hollow interior to extend longitudinally from the proximal open molding end 112a. The placement of the aperture centers the skewer within the hollow molding portion 121 so that the foodstuff can evenly shape itself around the skewer and move the skewer out of the mold as the foodstuff is pressed therethrough.

Figure 3A:
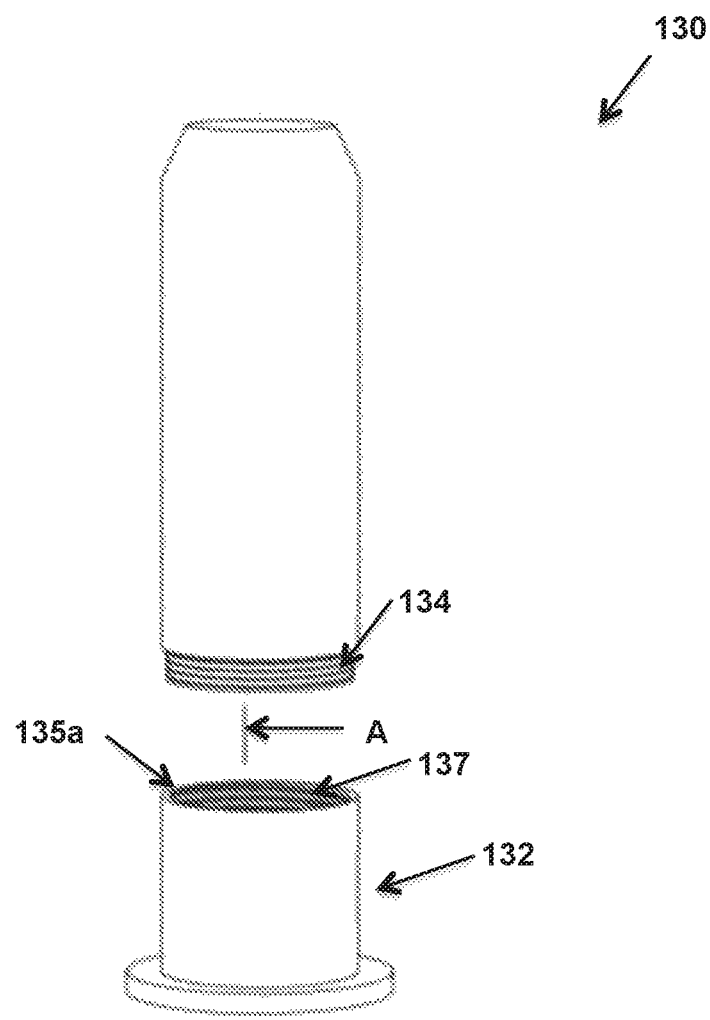
FIG. 3A is an exploded side view of the press.

FIG. 3A is an exploded perspective view of the press 130. This view illustrates the threads 137 disposed interiorially at the proximal open threaded end 135*a* of the cap 132. The interior threads 137 threadable engage the exterior threads 134 along A to cap the press.

Figure 3B:
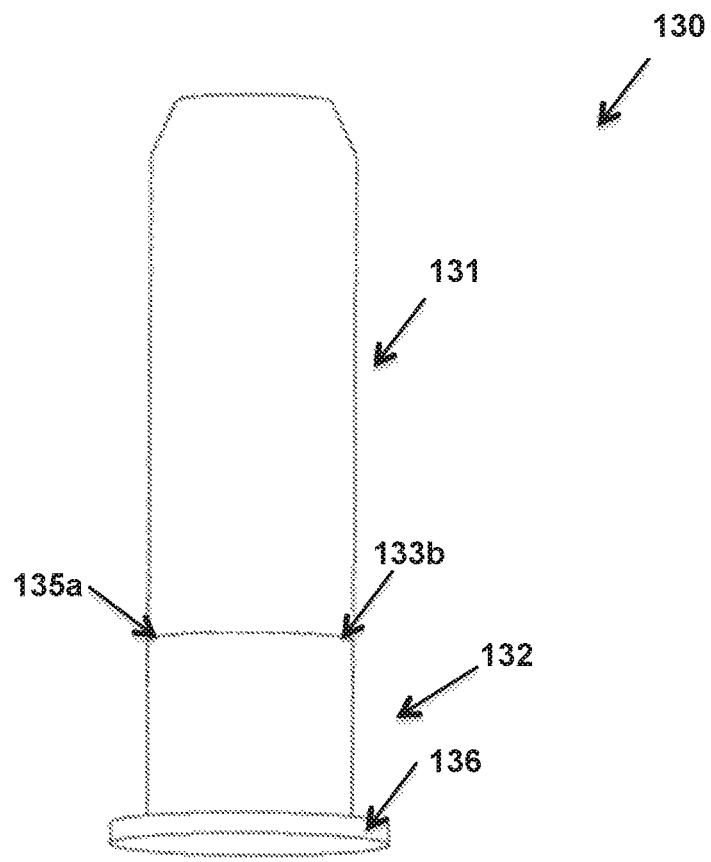
FIG. 3B is an assembled view of FIG. 3A.

With continued reference to FIG. 3A, FIG. 3B is an assembled view of the press 130. The cap 132 is threadably engaged at the proximal open threaded end 135*a* thereof with the hollow press body 131 at the edge of the distal open threaded end 133*b*. When threaded to the press body, the base plate 136 of the cap provides an extended surface against which a user applies pressure to press the foodstuff through the container and mold.

Figure 4A:
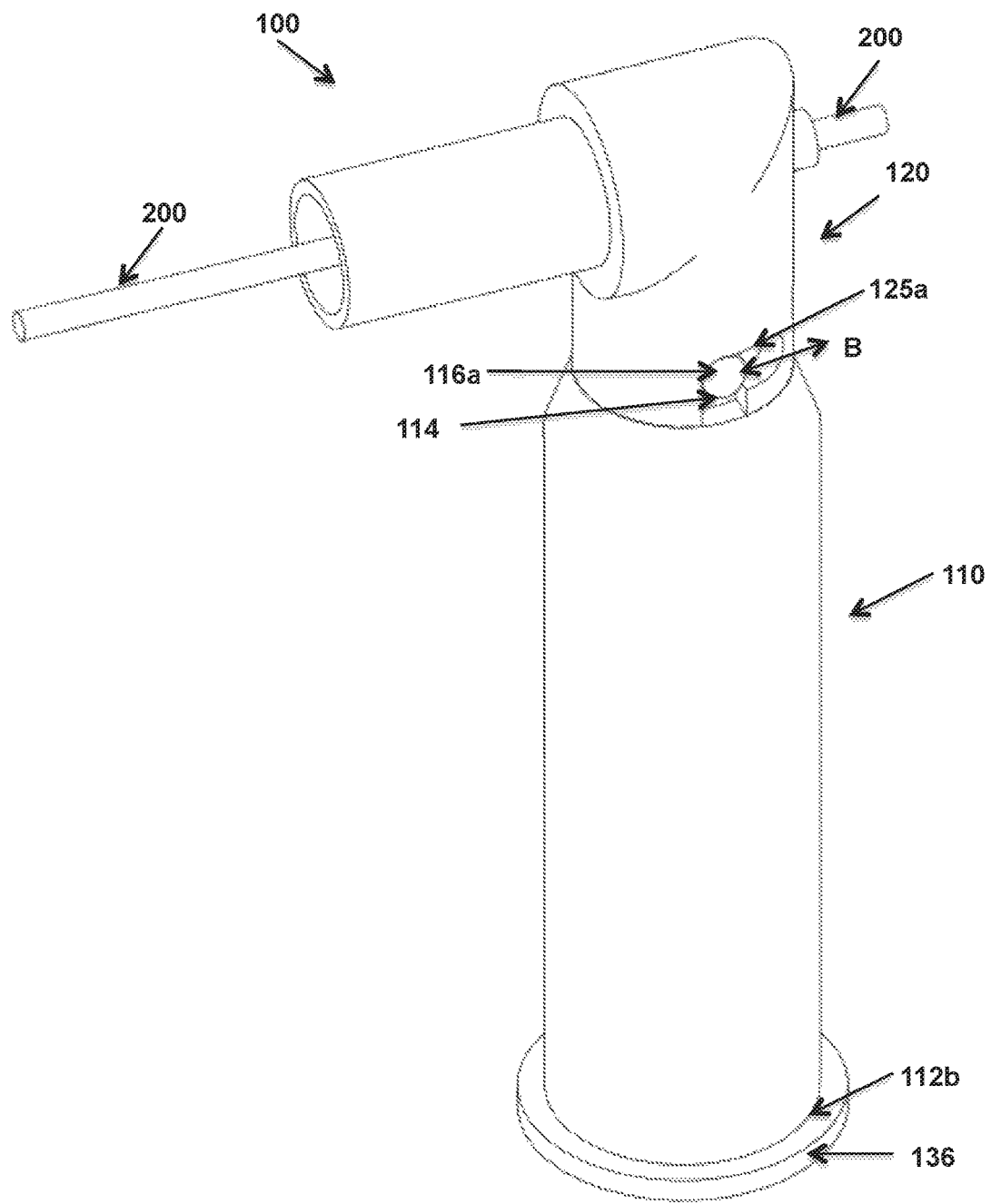
FIG. 4A is an assembled perspective view of FIG. 1A illustrating the position of a skewer after using the device.

With continued reference to FIGS. 1A and 2, FIG. 4A is a perspective view of the assembled device 100 with skewer 200. The device is assembled along A-A (see FIG. 1A) such that container 110 is removably engaged to the mold 120 and the press 130 (see FIG. 3B) is inserted into the container such that the distal open container end 112*b* rests against the base plate 136 of the press. A skewer 200 is disposed through the aperture 126. Particularly, in engaging the container to the mold, the pins 116*a,b* (pin 116*a* is shown) on the projection 114 are slid into the short arms of the L-shaped slots 125*a,b* (slot 125*a* is shown). Rotating the container moves the pins along B into the long arm of the L-shaped slots to secure the mold to the container. To disengage the mold, the container is rotated back to move the pins back along the long arms to the short arms of the L-shaped slots whereupon the mold is disengageable from the container.

Figure 4B:
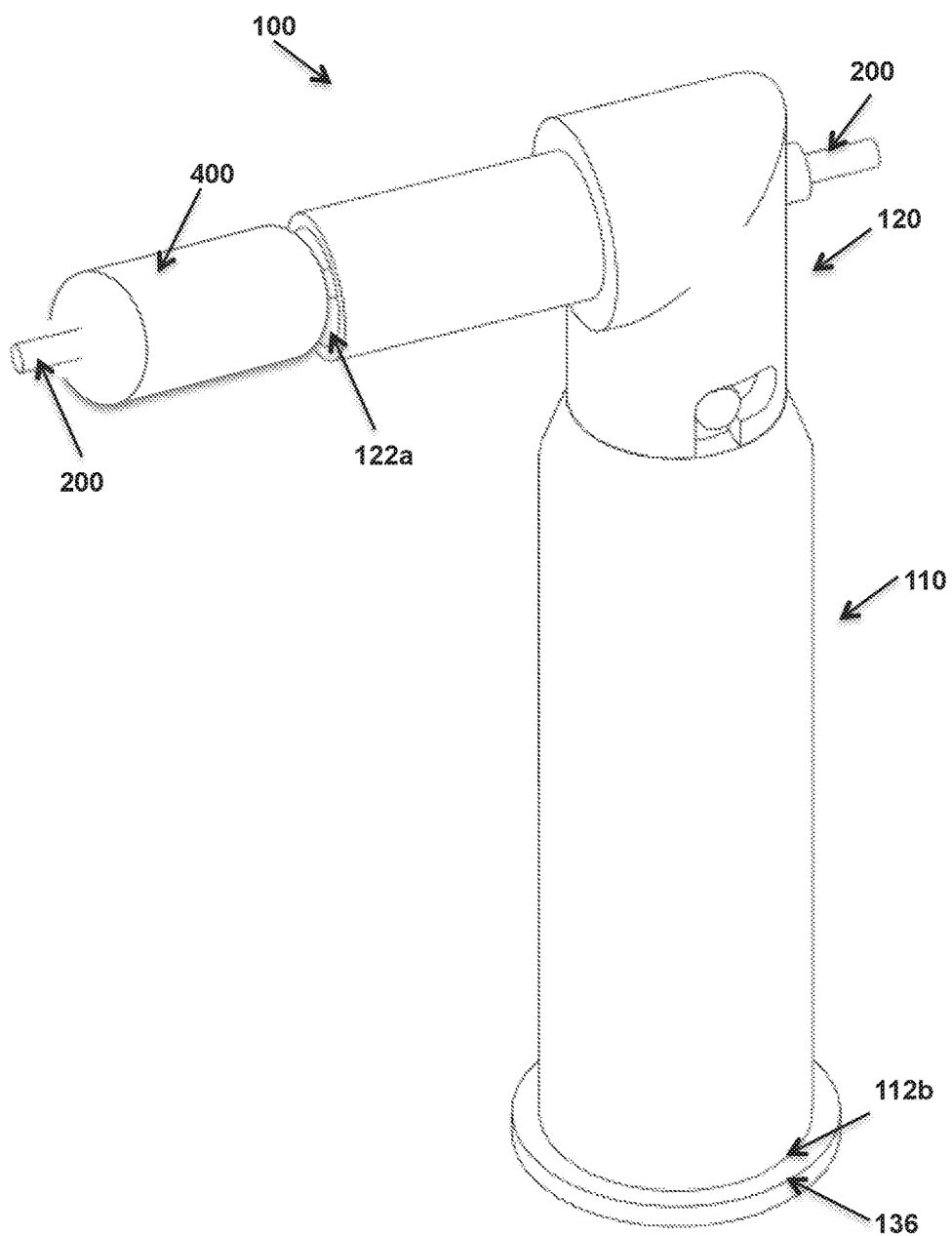
FIG. 4B is illustrates a kabob formed around the skewer in FIG. 4A.

FIG. 4B illustrates a kabob 400 produced by the device 100. The press 130 is pressed into the container 110 until the base plate 136 rests against the distal open container end 122*b*. This pushes the foodstuff loaded into the container into the mold 120 to form around the skewer 200 in a cylindrical shape corresponding to the hollow interior of the molding portion 121. Continued pressure on the base of the press causes the skewered kabob 400 to be extruded from the proximal open molding end 122*a*.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A device for molding a foodstuff, comprising:
   a container for the foodstuff;
   a molding component removably connected to the container having a molding portion with a first hollow interior, the molding portion having a proximal open molding end and a distal open molding end;
   a press removably engageable with the container and having a substantially cylindrical hollow body with a closed proximal end and a distal exteriorly threaded open end;
   a cap with a second hollow interior having an open interiorly threaded end and a base plate end, wherein the open interiorly threaded end of the cap is threadably engageable with the distal exteriorly threaded open end of the hollow body of the press, wherein a plurality of food skewers are stored within the substantially cylindrical hollow body of the press;
   an aperture disposed through a back surface of the molding portion to the first hollow interior;
   a rim extending above the back surface of the molding portion; and,
   wherein at least one food skewer of the plurality of food skewers is guided by the rim through the aperture and the proximal open molding end.

2. The device of claim 1, wherein the container comprises:
   a substantially cylindrical hollow body with a proximal open container end and a distal open container end;
   a projection formed circumferentially around the proximal open container end; and
   a pair of pins disposed oppositely on an outer surface of the projection and slidably engageable with the molding component.

3. The device of claim 2, wherein the molding component comprises:
   a connecting portion formed at the distal open molding end of the molding portion and depending downwardly and substantially perpendicularly therefrom in a fluid connection with the hollow interior of the molding portion and the hollow body of the container, said connecting portion comprising a pair of L-shaped slots formed oppositely on a distal open connecting end thereof configured to slidably engage the pair of pins on the container.

4. The device of claim 3, wherein the pair of pins on the container and the pair of L-shaped slots on the molding component comprise a bayonet connector when slidably engaged.

5. The device of claim 3, wherein the molding portion has an inner surface with a cylindrical shape, a rectangular shape, a square shape, or a triangular shape.

6. The device of claim 1, wherein the hollow body of the press has an outer diameter less than an inner diameter of the hollow body of the container such that the press is slidable therewithin.

7. The device of claim 1, wherein the foodstuff is a ground meat, a minced meat, a bread dough, a biscuit dough, or a cookie dough.

\* \* \* \* \*